Inventors
GILBERT RODLI
and RUFUS W. WILSON
By
KARL W. FLOCKS
Attorney

Inventors
GILBERT RODLI
and RUFUS W. WILSON
By
KARL W. FLOCKS
Attorney

Patented Feb. 20, 1945

2,369,983

UNITED STATES PATENT OFFICE 2,369,983

SURFACE MARKING APPARATUS

Gilbert Rodli and Rufus W. Wilson, Huntingdon, Pa.

Application October 15, 1941, Serial No. 415,116

10 Claims. (Cl. 275—2)

This invention relates to surface and road marking apparatus and more particularly to apparatus for the dispensing of autocollimating units such as glass or plastic spheres, quartz, or other granular material in connection with the fabrication of surface lines incorporating autocollimating units or such other granular material in binders such as paint and the like.

This application is a continuation-in-part of our copending application Serial No. 263,548, filed March 22, 1939, application Serial No. 263,548, issued on April 7, 1942, as Patent No. 2,278,948.

The significant part played by road markings, such as center lines, and lane margin lines, for example, in promoting safety on the highway has been widely recognized by state road officials and the utilization thereof on modern roadways has become universal. During the day the markings are clear and the observation thereof by the driver of a motor car on a highway incorporating a road marking presents no particular problem as long as the lines are fresh and well defined, that is, not obliterated by traffic. At night, however, when the lines are most needed, the part played by the road marking, as compared with the daytime, will be relatively small unless the reflection characteristics inherent therein are good.

Various expedients are depended upon to effect satisfactory surface markings among which are simply paint of different colors, such as for example, white and yellow which are most common; paint plus pumice to increase the reflection efficiency of the marking; metal foil; white or colored concrete; relatively large reflector buttons fabricated of glass or synthetic material anchored at spaced intervals; and paint incorporating glass spheres of microscopic size.

Road markings comprising simply white or colored paint, as has been stated, serve to reflect and diffuse light measurably, but the disadvantages of such simple marking comprise that of short life under normal traffic conditions, and improper reflection. The reflection of the light from the head lamps of a car traveling in one direction to the eyes of the driver of a car approaching from the opposite direction tends to blind the latter, the angle of incidence being equal to the angle of reflection. The diffusion serves to cause a relatively small portion of the light from the head lamps of the driver's car to be returned to him as compared with road markings incorporating autocollimating units, as will be later described.

Road markings including pumice as well as paint while not entirely satisfactory have shown a tendency to be longer lived than markings comprising simply paint and to have increased reflection characteristics; that is, to throw a greater proportion of the light from the head lamps of the driver's car back to the driver in order that the marking may appear clear and well defined to him.

The disadvantages inherent in white or colored concrete are similar to those recited above and include that of short life as the concrete soon becomes dirty, serving no longer as a road marking until freshened with paint. The first cost is usually high as is the case when relatively large reflector buttons fabricated of glass or synthetic material are anchored at spaced intervals. While these buttons efficiently reflect light in a desirable manner, their cost and expense of installation is prohibitively high for universal installation.

It is an object of the invention to provide an apparatus for the dispensing of autocollimating units or the like onto a binder, which apparatus is simple to operate and serves to distribute the units or the like over the binder in a manner to effect relatively high autocollimating efficiency and long life of the marker thus produced.

It is another object of the instant invention to provide an apparatus for dispensing spherical grains onto a reflecting binder, the arrangement of parts being such as to effect proper control of the apparatus in a novel and efficient manner.

Other objects and the nature and advantages of the invention will be apparent from the following description taken in conjunction with the accompanying drawings, wherein.

Figure 1:
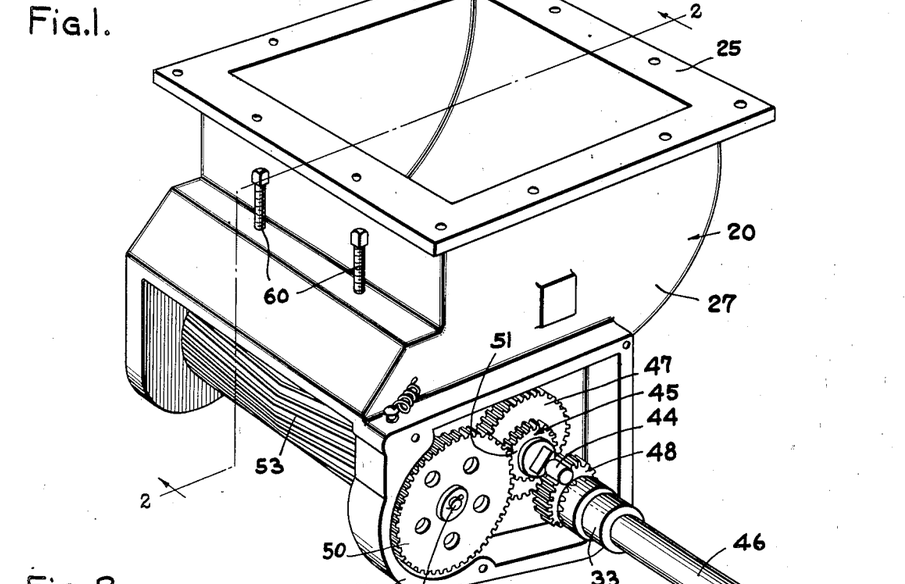
Figure 1 is a view in perspective of a dispenser with the storage tank, feed spout, and gear box cover plate removed.
Figure 2:
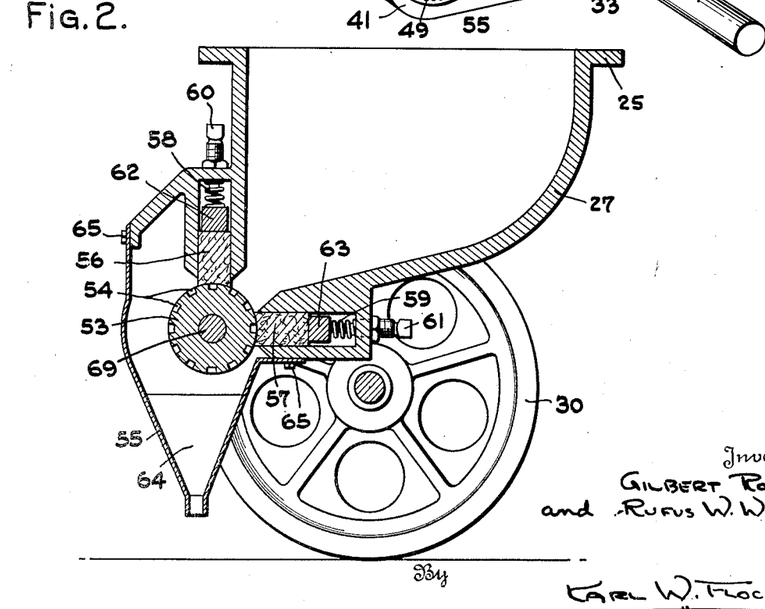
Fig. 2 is a view in section taken along lines 2—2 of Figure 1 and looking in the direction of the arrows.

Referring to Figures 1 and 2, a dispenser 20 is adapted to be supported above the surface to receive the autocollimating units by a pair of wheels 30 which may comprise tires of any suitable material, such as solid tires or pneumatic tires. Operation of the dispensing mechanism, later to be described, is effected by lateral movement of the dispenser 20 causing rotation of the rubber tired wheels 30 which are in frictional engagement with the surface to be marked. Rotation of the mechanism within the casing 27 is effected only when the half clutch coupling 33 is engaged, which engagement is brought about by actuation of an operating member, not shown, which is connected therewith. Upon reverse operation of said operating member the half clutch coupling 33 may be released to bring about cessation of operation of the dispenser 20. The casing 27 is provided with the flange 25 which is adapted to cooperate with a container or source of autocollimating units which are to be dispensed, but this container or source is not shown. For purposes of illustration, the gear box cover has been removed from the gear box portion 41 so as to expose the driving gear train between the half clutch coupling 33 and the dispensing rotor 53. The intermediate gear stud shaft 44 is adapted to be adjustably mounted in the cover for the gear box portion 41 which cover is not shown. This adjustable mounting insofar as the axis of rotation of the gear 45 is concerned makes it possible to substitute different sized gear wheels for the gear wheel 50 so that different speeds of rotation of the rotor 53 may be effected and corresponding distributions of material to be dispensed accomplished.

With the half clutch coupling 33 engaged, lateral movement of the dispenser 20 will effect rotation of the drive shaft 46 upon which the wheels 30 are normally mounted and rotation will be imparted to the large gear 47 of the compound gear 45 by the meshing drive gear 48 and finally motion will be imparted to the rotor shaft 49 by the driven gear 50 which meshes with the small gear 51 of the compound gear 45.

The casing 27 which receives autocollimating units from a hopper or other source, not shown, serves to direct same onto the surface of the rotor 53 which is formed with a series of receiving grooves 54 sealed from the feed spout 55 by the felt brushes 56 and 57, respectively. Each brush is adapted to be adjusted with regard to compression in relation to the surface of the rotor 53 by means of springs 58 and 59 and adjusting screws 60 and 61, respectively. The springs 58 and 59 may be either of the flat type or coil type and are arranged to engage metal stiffener bars 62 and 63, respectively, which in turn effect a proper compression of the hard glazed felt strips 56 and 57, respectively.

Formed within the lower portion of the feed spout 55 which is secured to the casing 27 by screws 65 are a plurality of baffles 64 so spaced as to effect a proper distribution of material or units to be dispensed.

The feed spout 55 as illustrated is preferably fabricated of sheet metal, but it is to be understood that it is within the scope of the invention to cast or mold same and that the number and size of the baffles or partitions 64 may be varied as desired.

Figure 3:
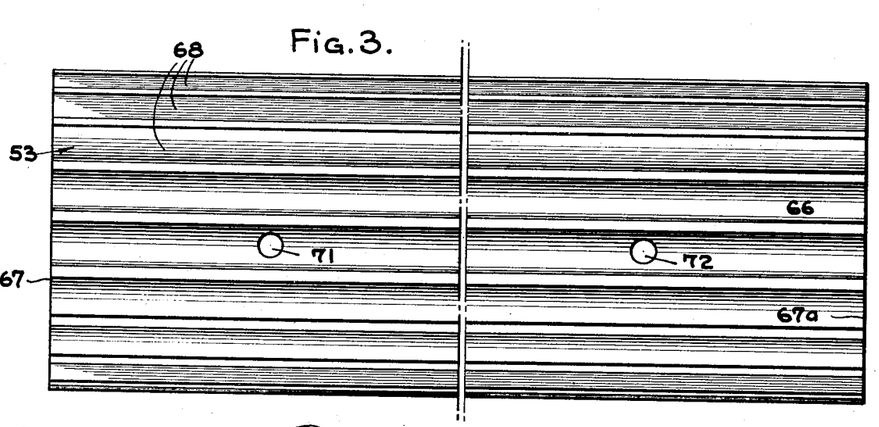
Fig. 3 is a view in elevation of a dispenser rotor in accordance with the invention.
Figure 4:
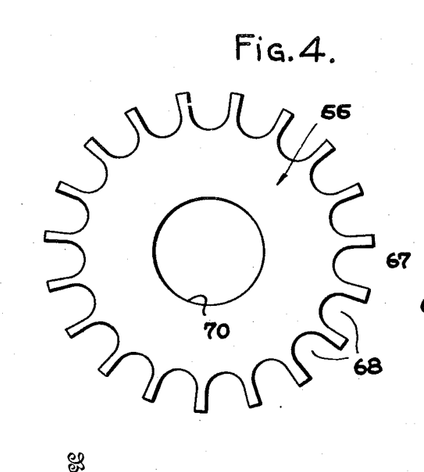
Fig. 4 is an end view of the rotor shown in Figure 3.

Referring to Figures 3 and 4, a rotor 53, which may be fabricated of metal or other suitable material, comprises a cylindrical body portion 66 formed with longitudinal grooves 68 which extend in a direction parallel to the axis of the rotor on the surface of the rotor, from one extreme end 67 thereof to the other extreme end 67a. The rotor shaft 69 is adapted to pass through the bore 70 in the body portion 66 of the rotor 53. Copper or raw hide shear pins are passed through holes 71 and 72 which are arranged transversely of the axis of the rotor and adapted to register with corresponding holes, not shown, which extend through shaft 69, which latter holes are formed perpendicular to the axis of said shaft. Should for any reason the rotor be prevented from rotating because of jamming of the material or units to be dispensed or otherwise, the shear pins are adapted to be the first to fail, thereby preventing injury to the rotor and the remainder of the dispenser 20.

In the marking of roadways, football gridirons, baseball diamonds, recreation grounds, warehouses, storage and parking lots and garages, aviation fields and industrial plants, certain types of apparatus have been devised to concentrate paint along the center of the line gradually thinning out toward its margins. As the life of the line or mark may be said to be a function of the number of partially embedded autocollimating units on its surface, when the units are glass spheres, it may be desirable in certain instances to concentrate a number of units distributed over the line along the center of same for the center having more binder or paint may hold a greater number of units securely. Now it is not always desirable to cover the entire surface of the mark or line, for to do so may involve increased expense by reason of the cost of additional material with no corresponding increase in reflection efficiency.

Figures 5, 6, 16:
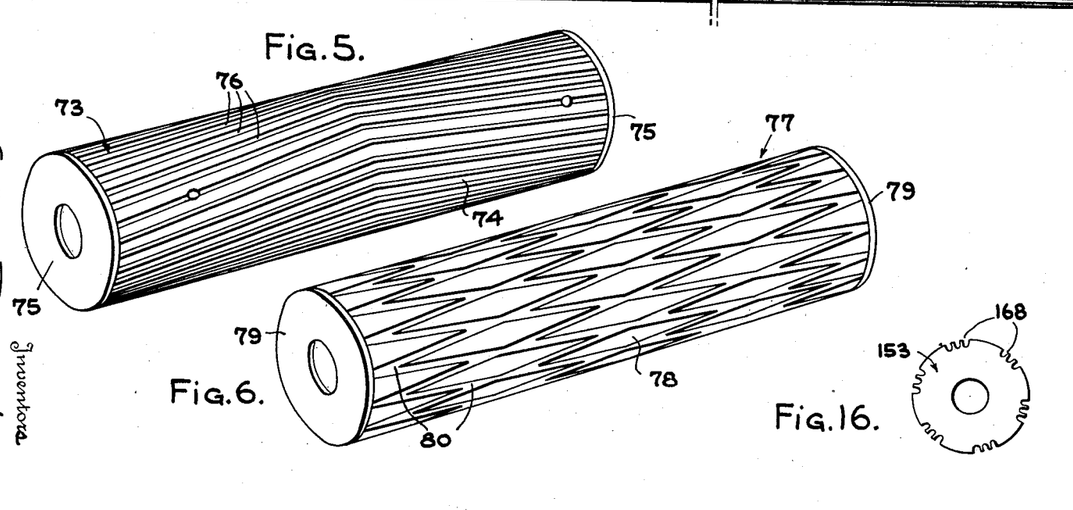
Fig. 5 is a view in perspective of a herringbone rotor.
Fig. 6 is a view in perspective of a rotor having on its surface a diamond-shaped pattern.
Fig. 16 is a view similar to Figure 4 but of a modified form of rotor.

Accordingly, a herringbone rotor 73, see Fig. 5, may be incorporated in the dispenser 20 in place of the rotor 53, which rotor 53 is so formed as to concentrate the number of units dispensed along the center of the line to be fabricated, yet distributing a proper amount of the units over all portions of the line to effect a finished marker of desired life and reflection characteristics. The rotor 73 may comprise a body portion 74 and end plates 75 to close the U-shaped open portions of the grooves or slots 76. When the rotor 53 is used in the dispenser 20, it is to be understood that the ends 67 and 67a are to be capped with end plates similar to the end plate 75 so that the grooves 68 of the rotor 53 will be closed at the ends and the felt seals 56 and 57 and the end plates already described will serve to cooperate with each other and the casing 27 to measure out the proper quantity of spheres or other units to be dispensed. When the rotor 53 is used in those dispensers later to be described, which include end sealing felts, the end caps, such as the end caps 75, may be eliminated.

For effecting still other distributions, depending on the character of the binder which is to be utilized in association with the units dispensed and the method of application of said binder, a rotor 77, see Figure 6, may be substituted for the rotor 53 illustrated in Figures 3 and 4. This rotor comprises a cylindrical body portion 78 which may have two end plates 79 covering the open end portion of the grooves 80 which are so arranged out of parallel with the axis of the rotor as to effect a diamond shaped pattern on the surface thereof. The distribution effected by this type of rotor has been found to give markedly high quality reflection and long life to a marker or line fabricated with the dispenser incorporating this rotor.

For effecting a continuous lane or center line which is capable of long life and high reflecting efficiency while making use of a relatively smaller number of autocollimating units or other material to be dispensed, for incorporation in their reflecting binder in order to enhance the reflectivity thereof, the rotor 153 may be utilized which comprises spaced sets of contiguous grooves 168 which serve to dispense autocollimating units or other units to be dispensed in a dashed-line pattern so that those portions of the marker which contain autocollimating units or other units to be dispensed are spaced from each other by a relatively small distance corresponding to the space between the sets of grooves 168 on the surface of the rotor 153. For purposes of illustration the spacing between the sets of grooves has been shown as being approximately the same in circumferential dimension as each set of grooves taken together and measured in the same manner. When a line so marked is viewed at night under the light from the headlamps of an automobile, the angle of light reflection measuring from the road surface is so small that the marked area gives the appearance of being continuous even though a relatively smaller number of autocollimating units may be utilized. It is, of course, to be understood that when the rotor 153 is used in the dispenser 20, end plates such as the end plate 75, shown in Fig. 5, are to be associated with the ends of the rotor 153. However, when end sealing felts are incorporated in the dispenser structure as will later be described, these end plates may be eliminated. This elimination of the end plates by the utilization of end sealing felts applies to all the rotors described.

In our copending application, the depth and width of the grooves of the various rotors are described as being of a dimension of approximately one-sixteenth of an inch when glass spheres of a diameter of from five to forty thousandths of an inch are to be dispensed. In connection with the herringbone rotor shown in Figure 5, the grooves 76 might be arranged so as to be five-sixteenths of an inch out of parallel with the axis of the rotor for every three inches of the axial length of same. While rotors having grooves of such dimensions have been found to be satisfactory under ordinary conditions, actual work in the field has led to the unexpected discovery that dispensing was more difficult in the early morning than during the middle of the day and in more humid climates than in relatively dry climates. This difficulty arises from the fact that when glass spheres are dispensed on a cold morning, moisture from the atmosphere condenses on the surface of the glass spheres and the dispensing action of rotors having grooves approximately one-sixteenth of an inch wide and one-sixteenth of an inch deep is impaired. It is apparent that the size of the grooves of the rotors is critical for proper dispensing action and that the size of these grooves must be larger than one-sixteenth of an inch in width and one-sixteenth of an inch in depth when spheres ranging from five to forty thousandths of an inch in diameter are to be dispensed. One ideal size of groove which is larger than one-sixteenth of an inch in width and one-sixteenth of an inch in depth is shown in connection with the rotor 53 in Figures 3 and 4 wherein the groove is approximately three-sixteenths of an inch in width and three-sixteenths of an inch in depth. Actually the bottom of the groove is rounded and the radius for the bottom curve of each groove is approximately three-thirty seconds of an inch. In the rotor 53, the space between the grooves measured on the exterior of the rotor 53 is .0743 inch. Such a rotor has been found in practice to dispense approximately .2 pound of spheres for each revolution of the rotor when the rotor is six inches in axial length and the outer diameter of the rotor is one and one-half inches. It is to be understood that it is within the scope of the invention to make grooves 76 in the rotor 74 and the grooves 80 in the rotor 77, as well as the grooves 168 of the rotor 153 of the same size as the grooves 68 of the rotor 53.

Figures 7, 8, 17, 18:
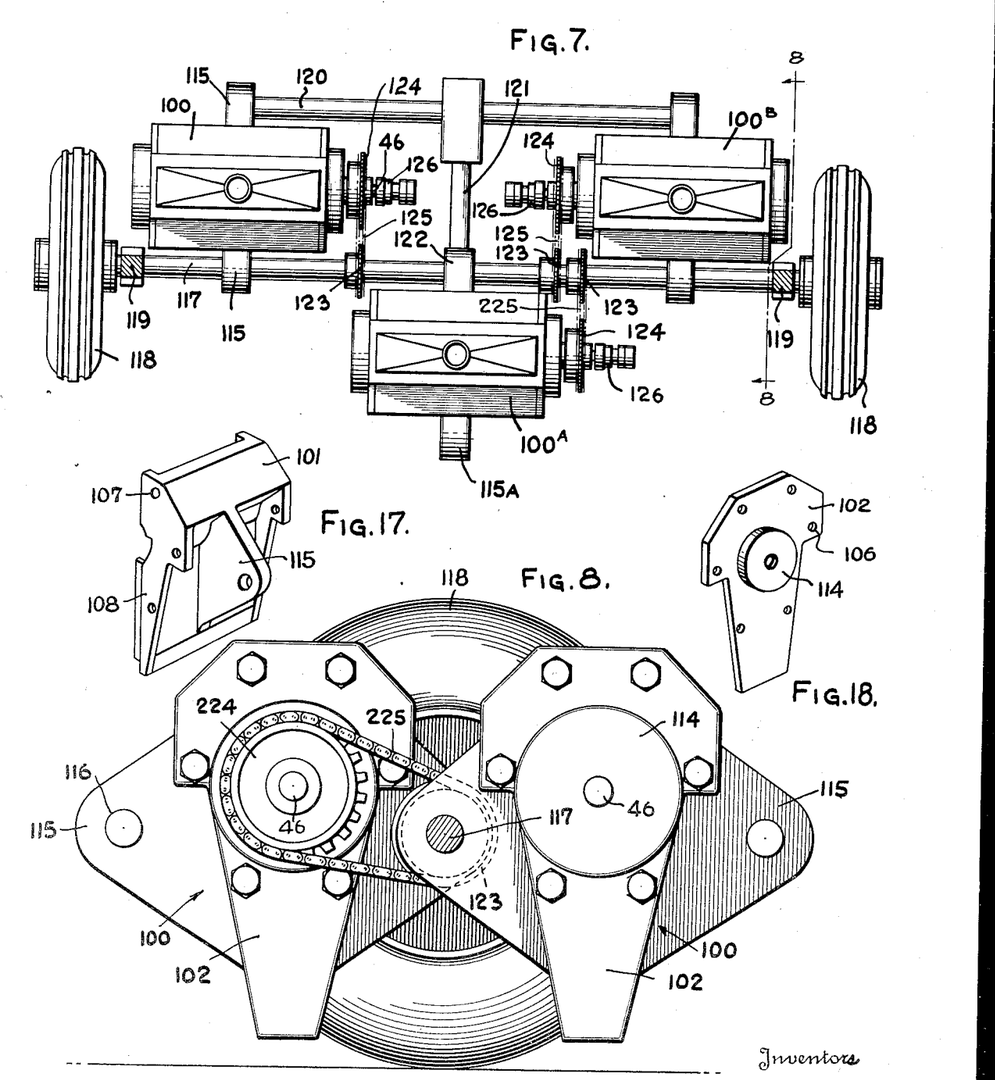
Fig. 7 is a plan view of a multiple dispenser assembly.
Fig. 8 is a section taken along line 8—8 of Figure 7 and looking in the direction of the arrows.
Fig. 17 is a view in perspective of the side elements of dispenser shown in Figs. 7, 8, 9, 10, 13, 14 and 15.
Fig. 18 is a view in perspective of the end element of the dispenser shown in Figs. 7, 8, 9, 10, 11, 12, 13, 14 and 15.
Figure 9:
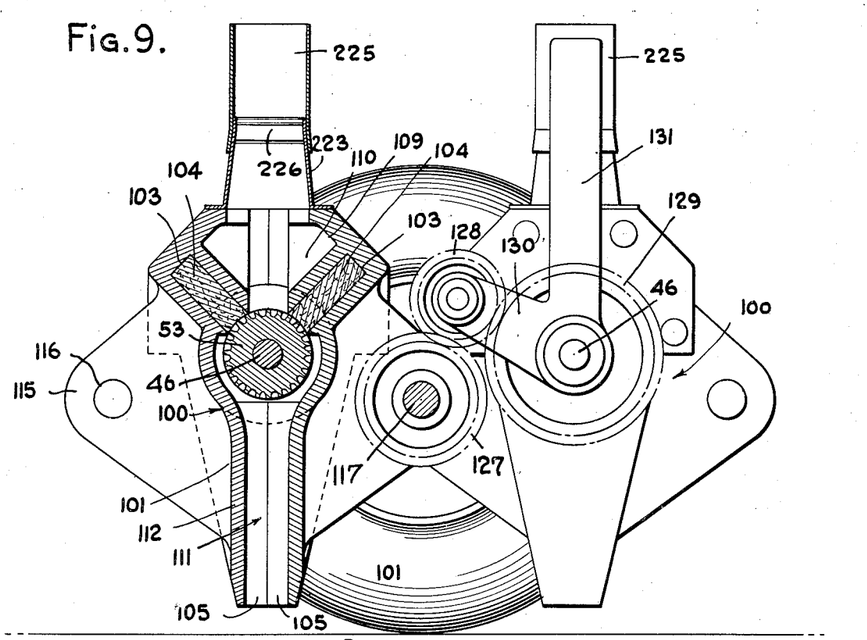
Fig. 9 is a view similar to Figure 8, but of a modified form of dispenser and assembly and illustrating a modified clutch arrangement.
Figure 10:
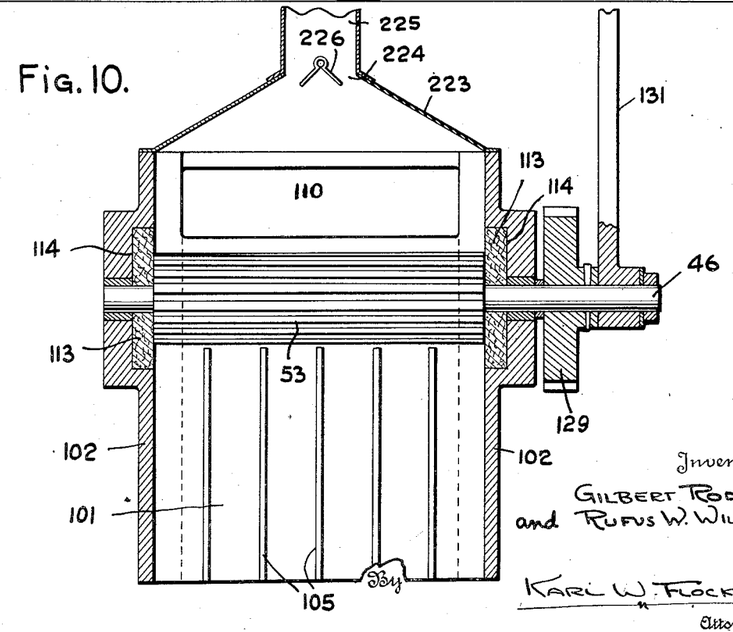
Fig. 10 is a transverse sectional view of one of the dispensers shown in Fig. 9, the section being taken through the axis of the rotor.

Referring to Figures 7, 8, 9, 10, 17 and 18, the modified form of dispenser 100 may comprise two identical side elements 101 such as shown in perspective in Figure 17, in transverse section in Figure 9 and in elevation viewing same from the inside in Figure 10. The dispenser 100 may also comprise two identical end elements 102 shown in perspective in Figure 18, in vertical transverse section in Figure 10 and in elevation in Figures 8 and 9. These elements 101 and 102, respectively, may be of cast metal or forgings or molded or otherwise fabricated.

The side elements 101, see Figures 9 and 17 in particular, each comprise walls forming a pocket 103 which extend throughout the entire length of the side element 101 and is adapted to receive a sealing felt 104 which in the assembled dispenser 100 contacts the rotor 53. The side elements 101 also each comprise a series of half-partitions or baffles 105 best shown in Figs. 17, 9 and 10 so that when the two side elements 101 are arranged contiguous with each other as shown in Fig. 9, they may be fixedly assembled by bolting thereto the end elements 102 with the holes 106 and the end elements 102 registering with the holes 107 in the side flange 108 of the side elements 101. It will now be apparent that with the arrangement described it is possible to assemble the body of the dispenser of only two pairs of elements with the elements in each pair being identical so that only two patterns are necessary. Further, if wider markers are to be fabricated, it is only necessary to substitute wider side elements 101 and the same end elements 102 may be used. Further, if any element is injured in the field, it may be readily removed and a new element substituted therefor. The formation of the inner upper portion 109 of each side element 101 is such as to provide a small chamber 110 between the two assembled side elements, see Fig. 9, which chamber 110 is adapted to receive glass spheres or other units to be dispensed. From the chamber 110 the units to be dispensed are directed onto the grooved rotor 53 between the two sealing felts 103 and as the rotor 53 rotates, the units are discharged into the discharge spout 111 formed by the lower portions 112 of the side elements 101, which discharge spout 111 is partitioned or baffled by the half partitions or baffles 105 so as to provide a series of discharge chutes extending along the entire length of the dispenser which corresponds to the width of the marker to be fabricated with the aid of the dispenser 100.

In the dispenser 100, the rotor 53 is formed with grooves 68 which extend from one extreme end thereof to the other. Cooperating with the ends 67 and 67a of the rotor 53 in the dispenser 100 are the end sealing felts 113 which are located in the recesses 114 in the end elements 102. Prior to utilizing the dispenser in the field, the end felts 113 and the sealing felts 104 are located in place with the dispenser elements assembled and with the felts being somewhat larger than the space which they occupy when the dispenser is in operation. The felts are then "broken in" by running the dispenser such as by driving it by an electric motor or by placing it in a lathe so that the sealing felts will adapt themselves to effect the proper compression and sealing effect. After the "running in" or "breaking in," the dispensers are ready for assembly with the frame of the device which is to carry the dispenser in the field. If desired, the felt adjusting screws 60 and 61 may be provided.

The side elements 101 are formed with ears 115 which are drilled at 116, see Figs. 17, 7, 8, 9, 13, 14 and 15. The assembled dispensers 100 may be mounted on the shaft 117 which rotates with supporting wheels 118 which are in contact with the ground adjacent the marker to be fabricated so that as the shaft 117 is pulled across the surface to be marked by a frame, not shown in Fig. 7, secured to the bearing supports 119, the pneumatic tire wheels 118 are caused to rotate and in turn the shaft 117 rotates within a bearing located in the ear 115 of the side elements 101 of dispensers 100. The bearings 119 may be bronze bushings when the dispenser is adapted to be propelled at a speed of less than fifteen miles per hour and may be ball bearings when the speed is in excess of fifteen miles per hour. Similarly the bearings in the bores 116 of the ears 115 and about the shaft 117 may be of bronze at speeds of less than fifteen miles per hour and of other ball type when the device is to be moved in excess of fifteen miles per hour. The ear 115 which is opposed to the ear associated with the shaft 117 may be connected to a fixed shaft 120 parallel to, but spaced from, the shaft 117. The ear 115 which is fixed to the shaft 120, which in turn is supported by the rod 121, is in bearing relation with the rotating shaft 117 at 122. The rod 121 may be supported by the main frame with which the bearings 119 are associated in order that as the shaft 117 is pulled across the surface to be marked, the shaft 117 may rotate and serve as the driver for the dispenser 100 while the dispenser 100 is properly supported in such position as to be capable of receiving power from the shaft 117.

Although it is contemplated that a single dispenser 100 be mounted on a shaft 117 which is secured to supporting wheels 118 in order to effect a single line marker, in the marking of certain highways which are to be striped with two or more parallel spaced lines of the same or contrasting colors, more than one dispenser may be associated with the shaft 117 as shown in Figure 7. Here three dispensers 100, 100A and 100B are associated with the shaft 117. The dispensers 100 and 100B are supported in a similar manner. Dispenser 100A is mounted in the same manner with respect to shaft 117, but the ear 115A thereof may be fixed to the main supporting frame and no shaft which corresponds to the shaft 120 utilized. It is contemplated that with the entire assembly shown in Figure 7, three parallel stripes may be laid or fabricated simultaneously. It is also contemplated that the width of the lines fabricated by the markers 100, 100A and 100B may vary or may be the same. Not only may the width be varied, but the color of the reflecting binder associated with the units dispensed from the dispensers 100, 100A and 100B may be different. For example, the binder to be associated with units dispensed from dispenser 100A may be yellow in color and the binder with which units dispensed from 100 and 100B are to be associated may be white in color or vice versa. Also, the dispenser 100A may fabricate an 8-inch line whereas the dispensers 100 and 100B may be used in the fabrication of a four or six inch line or any other combination of widths of marker may be effected by the utilization of the equipment shown in Fig. 7 as desired. Mounted on the shaft 117 are the driving sprocket wheels 123 which are connected with the driven sprocket wheels 124 by the chains 125. The rotors 53 within the dispensers 100, 100A and 100B are connected to the shafts 46 which in turn may be connected in driving relation of the hubs with the driven sprocket wheels 124 by the sliding of the half-clutches 126 inwardly and the shafts 46 may be disconnected from the hubs of the driven sprocket wheels 124 by sliding the half clutches 126 outwardly. Operating means, not shown, may be connected with the half clutches 126 so that the operation of the rotors 53 within the dispensers 100, 100A and 100B may be effected manually or by automatic means such as an air cylinder or solenoid which in turn may be controlled by a button convenient to the operator. The controls for the half clutches 126 may be so arranged that they may be operated simultaneously or individually as desired. Of course, it will be understood that when the clutches are in so that the driving shaft 117 is operably connected with the rotors 53, spheres will be dispensed and when the clutches are out and the driving connection disconnected, dispensing of spheres will cease. The utilization of the chain drive as described, or other flexible connections, is particularly adaptable in connection with installations of dispensers 100 on truck units where the main supporting frame is so located that a gear connection between the driving shaft and the dispenser is not feasible. Other constructions which make it essential that a chain drive as described be utilized occur in those instances wherein the binder dispensing gun or other binder dispensing equipment is associated with a power take-off shaft and the dispenser arrangement must be accommodated thereto in a manner which makes it impractical to use a gear drive.

Referring to Figures 9 and 10, the shaft 117 is provided with a driving gear 127 which is adapted to mesh with a traveling intermediate gear 128 which in turn meshes with the driven gears 129 which is directly connected to the shaft 46 on the rotors 53. The traveling gear 128 is rotatably mounted on the arm 130 which is fixedly connected to the operating lever arm 131 which in turn is pivotally mounted on the shaft 46. The gear 128 is always in mesh with the driven gear 129, but it may be moved into or out of meshing relationship with gear 127 by the operation of the lever arm 131 as will be apparent from inspection of Figure 9. The lever arm 131 may be operated manually or by an air cylinder or by a solenoid which in turn may be connected to a starter button or similar control located convenient to the operator. Each dispenser 100 may be provided with a similar control such as that described in connection with Fig. 9 and all the dispensers may be made to operate simultaneously or they may be individually controlled as described in connection with the dispensers 100, 100A and 100B shown in Fig. 7. The novel arrangement shown in Fig. 9 makes use of but one gear in addition to the driving and driven gears and the dispenser bodies may be fixedly associated with the frame of the vehicle which supports the dispensers. While the construction illustrated in Fig. 9 shows two dispensers associated with the driven shaft 117, it is to be understood that only one dispenser may be utilized or more than two may be utilized. It is also to be understood that on a single road to be marked, over some areas a single line marker is to be fabricated whereas over other areas of the same road a plurality of parallel lines are to form the marker. The arrangement described is capable of effecting such variation in markers over the same road simply by the operation of the controls referred to above.

Figure 11:
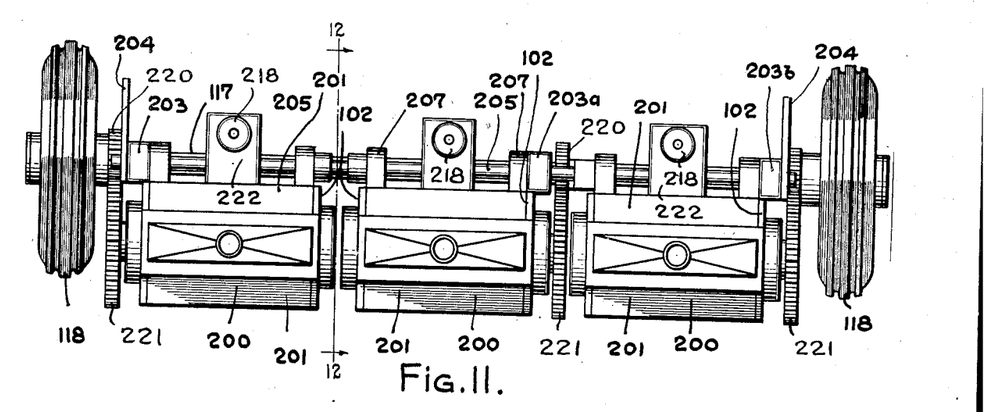
Fig. 11 is a plan view of a modified form of dispenser assembly and clutch arrangement.
Figure 12:
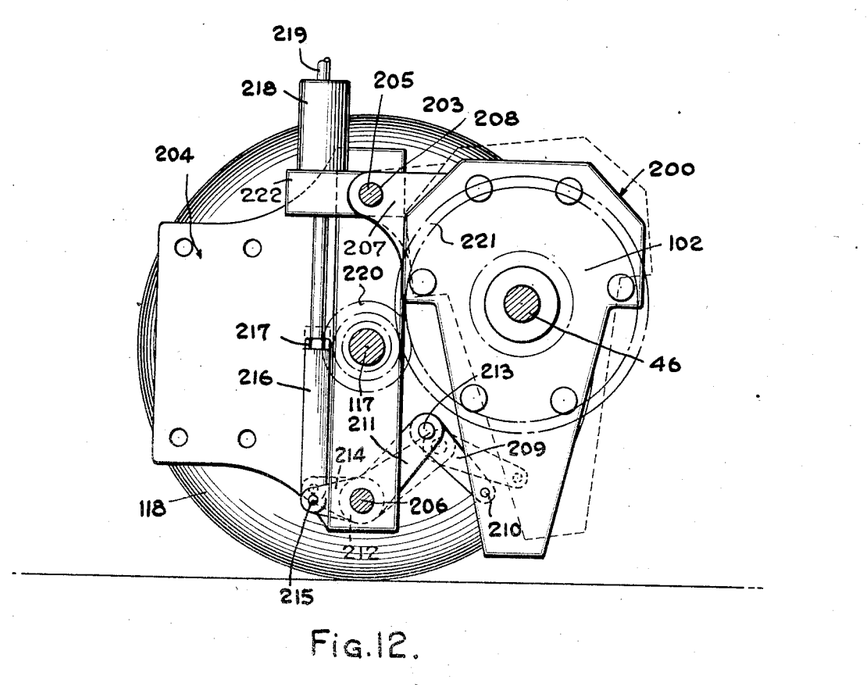
Fig. 12 is a transverse sectional view taken along line 12—12 of Figure 11 and looking in the direction of the arrows, particularly illustrating the novel clutching arrangement and control therefor.

Referring to Figures 11 and 12, the modified form of dispenser 200 comprises side elements 201 which are similar in every respect with the side elements 101 of the dispenser 100 with the exception that the ears 115 have been omitted. The end elements 102 of the dispenser 200 are the same end elements 102 that are used on the dispenser 100. The main shaft 117 of the dispenser assembly, with which the dispensers 200 are associated, are secured to the surface contacting wheels 118 as described in connection with the dispenser assembly shown in Fig. 7. The drive shaft or axle 117 is journaled in the bearing blocks 203, 203a and 203b. Tow or hitching plates 204 are secured at the outside ends of bearing blocks 203 and 203b. These tow or hitching plates and/or the bearing blocks are adapted to be secured to the frame of the propelling vehicle such as a truck. In the same vertical plane as the drive shaft or axle 117 are the two fixed cross rods 205 and 206 which are secured to the bearing blocks 203, 203a and 203b. Formed integral with or secured to the side 201 which is adjacent the drive shaft or axle 117 are two ears 207 which are drilled at 208 so that the said ears 207 may be pivotally mounted on the cross rod 205 which is secured to the bearing blocks 203, 203a and 203b. In cooperation with the lower part of the dispensers 200, the operating lever 209 is pivotally secured to the bottom portion of the dispenser 200 at 210 and the opposite end of the operating lever 209 is pivotally secured to the arm 211 of the bell crank 212 at 213.

The bell crank 212 is pivotally mounted on the lower cross rod 206 and has an arm 214 which is pivotally secured at 215 to the plunger rod 216 which comprises a length adjusting nut 217 and is associated with a piston within a compressed air cylindrical chamber 218 which cylinder is provided with a compressed air inlet conduit 219 which in turn is connected to a compressed air source on the propelling vehicle not shown. With the piston in the cylinder 218 in its lowest position, the bell crank 212 in full line position, the dispenser 200 will be in its operating position with the driving gear 220 which is secured to the shaft 117 in mesh with the driven gear 221 which is fixedly secured on the shaft 46 of the rotor 53. When under the influence of compressed air the piston within the cylinder 218 is raised, the plunger rod 216 will be correspondingly lifted causing rotation of the bell crank in a clockwise direction and operation of the lever 209 in a manner to cause it to move the lower end of the dispenser 200 outwardly to the position shown in broken lines and thereby causing the dispenser 200 to bodily rotate about the cross rod 205 as a pivot and bringing the driven gear 221 out of mesh with the driving gear 220 so that the rotor 53 will no longer serve to dispense glass spheres or other units to be dispensed. This novel construction makes use of but two gears in the drive between the driving shaft and the rotor 53 of the dispenser 200 and all additional clutching mechanism has been obviated, with, of course, the exception of the operating lever system which may be automatically operated by the compressed air cylinder already described or an electrically operated solenoid may be substituted for the air cylinder. It is to be understood that plunger rod 216 may be manually operated if desired.

For the three dispensers as shown in Figure 11 it is to be understood that a single dispenser may be substituted and operated similarly and a system involving a plurality of dispensers has been described which is capable of practical and more universal use. In the construction shown in Figs. 11 and 12, the dispensers 200 may be entirely supported by the cross rods 205 and 206 and it is, of course, to be understood that when the dispensers 200 are in their lower or operating position, they may be kept in this position by the utilization of air pressure in a downwardly direction on the piston within the cylinder 218. The weight of the dispensers 200 also serves to keep them in their operative position. The air cylinders 218 are fixed with respect to the frame of the assembly and may be secured to the blocks 222 which in turn are fixed to the cross rod 205.

The action of the sealing felts on the rotors within the various dispensers described serves to keep them from rotating at the time when it is desired that dispensing cease and when the driving connection between the driving shaft and the rotor shaft has been broken due to the friction between the rotor surface and the sealing felts.

Referring to Figures 9 and 10 in particular, and generally referring to the dispensers 100 and 200, the tops of the dispensers may be provided with an upwardly dished cover 223 formed with an opening in the uppermost portion thereof 224. The conduit 225 is connected to the opening 224. Within the opening 224 an inverted V-shaped distributor baffle 226 may be arranged to effectively distribute the spheres or other units to be dispensed over the exposed surface of the rotor which extends between the sealing felts. Each conduit 225 may be connected with a common glass sphere or other unit to be dispensed magazine which is not shown. In some cases where the utilization of a common magazine is impractical, the covers 223 and the conduits 225 may be dispensed with and a hopper having a bottom opening corresponding to the top opening of the dispensers 100 and 200 may be substituted. If desired a valve in the conduits 225 may be provided though it has been found in practice that effective control of the dispensers 100 and 200 may be accomplished by the utilization of the mechanisms described without the necessity of any auxiliary control.

In order to facilitate ready fabrication of this assembly of the dispenser side elements 101 and 201 and end elements 102, not only may separate sets of bolts be utilized to fasten each end element to the side elements, but a single set of relatively long bolts may be passed through both end elements and the flanges of the side elements so that all the heads of the bolts may be associated with one end element and all the nuts associated with the opposite ends of the bolts and the opposite end element.

Figure 13:
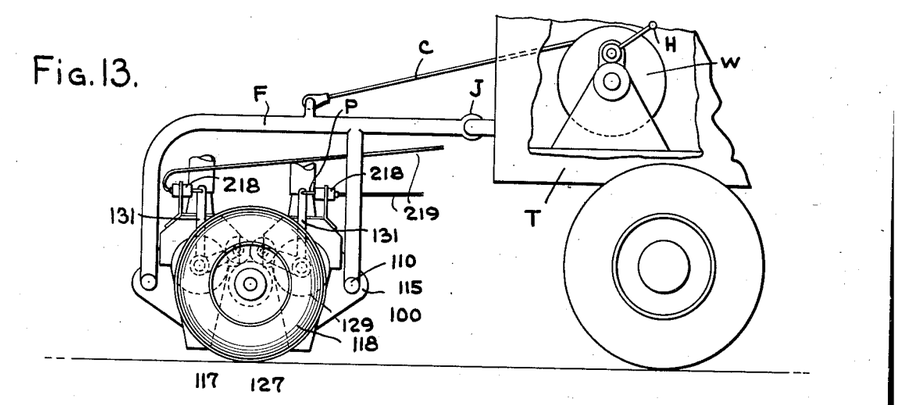
Fig. 13 is a fragmentary elevational view of a dispenser assembly and truck illustrating operating controls therefor.

In the fabrication of highway lane lines and center lines it is sometimes necessary to bring the fabricating equipment over a long distance before marking is begun. The equipment may generally comprise a truck T, see Figs. 13, 14 and 15, on which a binder supply tank may be located as well as a binder applicator. As the spheres or other unit dispensing equipment 100 is operated by contacting the wheel 118 with the surface S to be marked, and it is essential that the truck be moved to the locale of the marking as quickly as possible, it is not desirable that the dispenser be operated even though the rotor be declutched or disconnected from the driving shaft 117 to which the wheels 118 are secured. Accordingly, in accordance with the invention, means are provided to bodily lift the dispensers from the surface to be marked during the time when the truck T is driven to the locale of operations. It is contemplated in accordance with the invention that a winch W be provided on the truck for lifting the frame F to which the dispensers 100 are secured. The handle H, see Fig. 13, is rotated in a clockwise direction thereby taking up the cap C and causing the frame F to pivot about the joint J and lift the dispensers 100 from the rod. The handle may be locked in place by a suitable ratchet and pawl or other locking device. When the truck arrives on the set of operations, the locking device may be unlocked and the dispenser 100 lowered to the surface to be marked. As the truck T is moved over the roadway to be marked and it is desired that dispensers 100 begin operation, the operator effects such controlled operation of the compressed air supply as to initiate the flow of compressed air through the hose 219 to cause the piston within cylinder 218 to effect operation of the plunger P thereby causing movement of the operating lever 131 in a direction such that the intermediate gear 128 meshes with the driving gear 127 thereby causing rotating of the driven gear 129 and corresponding rotation of the dispensing rotor within the dispenser 100. When temporary cessation of operation of the dispenser is desired in order to fabricate the marker in accordance with a predetermined plan, the compressed air is caused to act on the piston within the cylinder 218 to cause the piston to move in the opposite direction thereby moving the gear 128 out of mesh with the driving gear 127 so that the sealing felts within the dispenser 100 will effect sufficient friction on the dispensing rotor so as to cause same to cease rotation.

Figure 14:
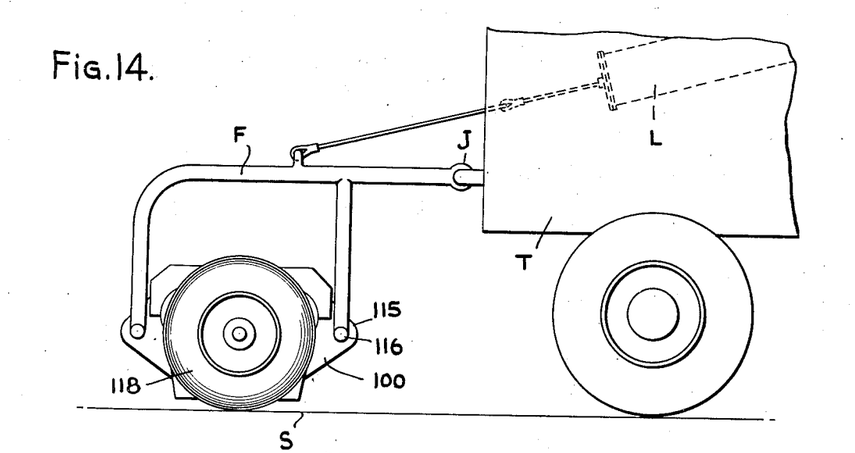
Fig. 14 is a view similar to Figure 13 but of a modified arrangement.

In Figure 14, the hydraulic lift L is utilized to lift the frame F about the joint J so that the dispensers 100 will be lifted from the road surface S.

Figure 15:
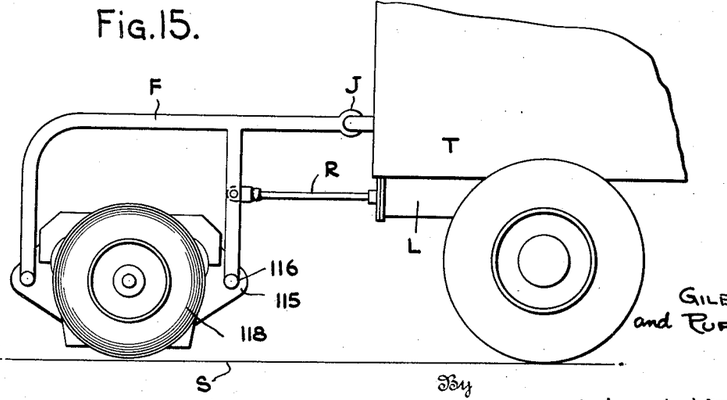
Fig. 15 is a view similar to Figures 13 and 14 but of a modified arrangement.

In Figure 15, the hydraulic lift L is located below the joint J so that a push on the rod R will effect the lifting of the frame F to which the dispensers 100 are attached so that the wheels 118 will no longer contact the surface S. The reverse action of the lift L will bring the dispensers back to their operative relation with respect to the road surface S. In Figures 13, 14 and 15, separate means from the truck motor have been illustrated for effecting movement of the frame F; and it is to be understood that it is in accordance with the invention to utilize any power take off of the truck whether such power take off be connected directly to the truck propelling motor or whether it be connected to an auxiliary motor. For example, the winch W may be operated by a gas or electric motor on the truck or by a power take off associated with the truck propelling engine. The lifts L may be operated from a compressed air tank located on the truck which may be operated by an auxiliary motor compressor unit or the compressor unit may be directly connected to the truck propelling engine.

For purposes of illustration the dispensers 100 have been shown in association with the trucks T in Figs. 13, 14 and 15, but it is contemplated that any form of dispenser described above may be so associated.

Though the dispensing units, Figs. 13, 14 and 15, have been shown as located to the rear of the truck T, it is contemplated that they also may be located at the side of the truck T.

The dispensers and dispenser assemblies described above may be associated with binder applicators of the spray type, brush type or other suitable binder applicator means. For example, the binder may be applied by flowing same onto a roller which engages the surface to be marked.

It will be obvious to those skilled in the art that various changes may be made in this device without departing from the spirit of the invention and therefore the invention is not limited to what is shown in the drawings and described in the specification but only as indicated in the appended claims.

What is claimed is:

1. A dispenser for dispensing spherical grains and the like in generally not more than a single layer onto a reflecting binder for the preparation of highway surface markers comprising: a hopper, a rotor formed with depressed portions, the depressed portions extending generally axially of the rotor on the surface thereof, a casing for said rotor, means in contact with said rotor for sealing said rotor to prevent grains within said hopper from falling past said rotor without entering said depressed portions, means for causing rotation of said rotor, a substantially rigid discharge spout in spaced relation to the surface of said rotor and extending below and substantially vertically downwardly therefrom, said discharge spout being formed with an opening extending substantially across its entire bottom, the end walls of said spout being spaced at least as far apart as the length of said depressed portions on the surface of said rotor, said rotor having its operating surface operating freely and out of contact with the remainder of said apparatus with the exception of said sealing means which contacts the surface of said rotor, said rotor and said sealing means solely making up the mechanism for dispensing of spherical grains to the surface to be marked, the grains passing said sealing means within the depressions of the rotor falling freely through the spout to the surface to be marked, whereby said dispenser serves to distribute grains in accordance with a predetermined plan onto the area over which the dispenser is moved, the area being covered being generally as wide as the axial length of the depressed portions on said rotor surface.

2. The structure recited in claim 1, said depressed portions in said rotor comprising grooves on the surface thereof extending in a direction parallel to the axis of said rotor.

3. The structure recited in claim 1, said sealing means comprising felt strips, housings for each of said felt strips, said housings being formed with openings adjacent said rotor, said felt strips being located in said housings with portions thereof extending through said openings therein and being in contact with said rotor, and means for adjustably compressing each of said felt strips.

4. The structure recited in claim 1, said rotor being formed with a plurality of herringbone grooves on its surface.

5. The structure recited in claim 1, said rotor being formed with diamond-shaped grooves on its surface.

6. A dispenser for dispensing spherical grains and the like in generally not more than a single layer onto a reflecting binder for the preparation of highway surface markers comprising: a hopper, a rotor formed with depressed portions, a casing for said rotor, a driven shaft connected to said rotor, a gear wheel mounted on said driven shaft, a driving shaft, a driving gear mounted on said driving shaft, walls forming a gear box associated with said rotor casing, an adjustable intermediate shaft adapted to be associated in adjustable relation with said gear box, an intermediate gear mounted on said intermediate shaft, said intermediate gear adapted to mesh with said driving gear and said driven gear whereby the ratio of speed of said rotor to the speed of said gear on said driving shaft may be varied by substituting different size gears for said driven gear and adjusting the position of said intermediate gear correspondingly.

7. The structure recited in claim 1, said rotor being formed with grooves approximately three sixteenths of an inch wide and three sixteenths of an inch deep, said dispenser being adapted to dispense glass spheres of sizes ranging from five thousandths of an inch to forty thousandths of an inch positively without interference due to the atmospheric condensation.

8. The structure recited in claim 1, said rotor being formed with grooves more than one-sixteenth of an inch wide and more than one-sixteenth of an inch deep, said dispenser being adapted to dispense glass spheres of sizes ranging from five thousandths of an inch to forty thousandths of an inch positively without interference due to the atmospheric condensation.

9. A multiple dispenser assembly comprising a main driving shaft, surface contacting wheels fixed to said main driving shaft, a dispenser located on one side of said driving shaft and operatively connected thereto, a pair of additional dispensers located on the other side of said driving shaft and operatively connected thereto, each of said dispensers being spaced from each other in a direction parallel to the axis of said driving shaft.

10. In a dispensing apparatus, a wheeled frame, a wheeled dispenser movably mounted on said frame, means for transmitting motion from the wheels of said dispenser to the mechanism within same when the wheels of said dispenser contact the surface to be marked, and means for lifting the wheeled dispenser from the surface to be marked, said last mentioned means being mounted on said wheeled frame, friction means within said dispenser mechanism cooperating to effect a predetermined dispensing action and for preventing operation of said mechanism when the wheels of said dispenser are lifted from contact with the surface to be marked, whereby said wheeled frame may be moved to and from the area to be marked with the wheeled dispenser lifted from the surface traversed when bringing the apparatus to the surface to be marked.

GILBERT RODLI.
RUFUS W. WILSON.